(12) United States Patent
Ikeda et al.

(10) Patent No.: US 6,553,788 B1
(45) Date of Patent: Apr. 29, 2003

(54) GLASS SUBSTRATE FOR MAGNETIC DISK AND METHOD FOR MANUFACTURING

(75) Inventors: Hiroshi Ikeda, Osaka (JP); Yoshihiro Matsuno, Osaka (JP); Takeo Watanabe, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/510,608

(22) Filed: Feb. 22, 2000

(30) Foreign Application Priority Data

Feb. 23, 1999 (JP) ............................ 11-044605
Apr. 28, 1999 (JP) ............................ 11-122781

(51) Int. Cl.⁷ .............................................. C03C 17/00
(52) U.S. Cl. ................... 65/31; 65/88; 216/97; 216/100; 216/103; 216/104; 216/108; 216/109
(58) Field of Search .................... 65/31, 88; 216/97, 216/100, 103, 104, 108, 109

(56) References Cited

U.S. PATENT DOCUMENTS

| | | | |
|---|---|---|---|
| 4,833,001 A | * 5/1989 | Kijima et al. ............... 428/141 |
| 4,841,680 A | * 6/1989 | Hoffstein et al. .......... 51/283 R |
| 4,985,306 A | * 1/1991 | Morizane et al. ............ 428/410 |
| 5,061,571 A | * 10/1991 | Sakamoto et al. ........... 428/480 |
| 5,494,721 A | * 2/1996 | Nakagawa et al. ......... 428/64.1 |
| 5,618,448 A | * 4/1997 | Kuroe et al. .................... 216/97 |
| 5,871,654 A | * 2/1999 | Mannami et al. .............. 216/22 |
| 6,117,220 A | * 9/2000 | Kodama et al. ................ 106/3 |
| 6,159,076 A | * 12/2000 | Sun et al. ....................... 451/36 |
| 6,210,525 B1 | * 4/2001 | James et al. ................. 156/345 |

FOREIGN PATENT DOCUMENTS

| JP | 04220367 | 11/1993 | ............ G11B/5/66 |
|---|---|---|---|
| JP | 05300044 | 6/1995 | ............ G11B/5/704 |
| JP | 08291352 | 5/1998 | ............ G11B/5/84 |

* cited by examiner

Primary Examiner—Stevan A. Resan
(74) Attorney, Agent, or Firm—Marsh Fischmann & Breyfogle LLP

(57) ABSTRACT

A method of manufacturing a glass substrate for a magnetic disk. The method includes the step of scrub-etching the glass substrate using a pad in the presence of an acid treatment solution. As the acid treatment solution, hydrofluoric acid is used in a range of 0.01 to 1 wt %. The scrub-etching step is performed at temperatures ranging from 5 to 60° C. for 1 second to 300 seconds. The method produces a substrate that is substantially free of asperity.

29 Claims, 3 Drawing Sheets

GLASS SUBSTRATE FOR MAGNETIC DISK AND METHOD FOR MANUFACTURING

BACKGROUND OF THE INVENTION

The present invention relates to a glass substrate and a method of manufacturing a glass substrate, and more particularly, to a glass substrate and manufacturing method for a magnetic disk, which has a fine textured surface.

Magnetic disks for use in hard disk drives are typically formed with a fine textured surface (pits and projections) for preventing adhesion between a head and the magnetic disk surfaces. In recent years, finer textures have been desired in order to increase the density of magnetic recording. However, using commercially practiced film texture methods and mechanical texture methods it is difficult to form the required fine textured surfaces.

Some techniques for forming a texture on the surfaces of substrates through etching are known. For example, Japanese Unexamined Patent Publication No. Hei 5-314456 discloses a technique for forming a texture by etching a glass substrate in a mixed solution of hydrofluoric acid and potassium fluoride. Japanese Unexamined Patent Publication No. Hei 10-134348 discloses a technique for forming a magnetic layer and a protective layer on a glass substrate in sequence, and then forming a texture on the surfaces of the protective layer through etching. The texture formed by the above prior art has a maximum surface roughness Rmax of 30 angstroms.

Japanese Unexamined Patent Publication No. Hei 7-153059 discloses a technique for forming a texture directly on surfaces of a glass substrate by etching the glass substrate in a hydrofluoric acid-potassium fluoride mixed solution. The height of projections of the resulting texture ranges from 130 to 400 angstroms when measured by a contact needle type surface roughness tester (trade name: Taristep, manufactured by Lank Taylor Bobson Co.).

However, the glass substrates fabricated by the prior art may sometimes have localized areas with higher projections than the average height of projections, which is known as an asperity. If a magnetic disk is manufactured using the glass substrate having such asperity, the resulting magnetic disk may experience head crash. Such a magnetic disk is susceptible to a gliding error, which may arise when a magnetic head hits an asperity in its movement (gliding). Thus, the asperity reduces production yields of the magnetic disks.

Also, even if glass substrates having the same composition are etched under the same conditions, the roughness and configuration of the fine textured surface cannot be consistently reproduced. Such unstable reproducibility makes it difficult to reliably mass-produce glass substrates having uniformly fine textures.

In recent years, majority type of hard disk drives is a ramped loading type. The magnetic head, which used in the ramped loading type, is located above the disk surface spaced by about 10 nm. However, the design of magnetic heads differs from one hard-disk manufacturer to another, also the design of head-disk-interfaces differs. Therefore, the hard-disk manufacturers respectively require slightly different degrees of surface roughness on the magnetic disk. It is therefore desired to accurately control the roughness of the fine textured surfaces.

SUMMARY OF THE INVENTION

It is an object of the present invention to provide a method of manufacturing substrates, which is capable of forming a fine texture without asperity with good reproducibility.

To achieve the above objective, the present invention provides a method for manufacturing a glass substrate for a magnetic disk. The method includes scrub-etching a surface of a glass substrate material using a scrubbing pad in the presence of an acid treatment solution.

Another aspect of the present invention provides a glass substrate for a magnetic disk including a glass substrate material having a fine texture formed on a surface thereof by scrub-etching.

Further aspect of the present invention provides a method of manufacturing a substrate for a magnetic disk. The method includes forming a fine texture, having an average surface roughness Ra in a range between 0.4 and 3.0 nm and a ratio of a 10-points mean roughness (Rz) to the average surface roughness Ra of 14 or less, on a substrate made of an inorganic material or on a substrate having an alloy film on a surface thereof. The forming step includes the repeatedly performing an immersion process or scrub process several times using an acid solution under different conditions.

Further aspect of the present invention provides a substrate for a magnetic disk having a fine texture. The substrate has an average surface roughness Ra in a range of 0.4 to 3.0 nm and a ratio of a 10-points mean roughness Rz to the average surface roughness Ra equal to or less than 14.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

First embodiment

Figure 1:
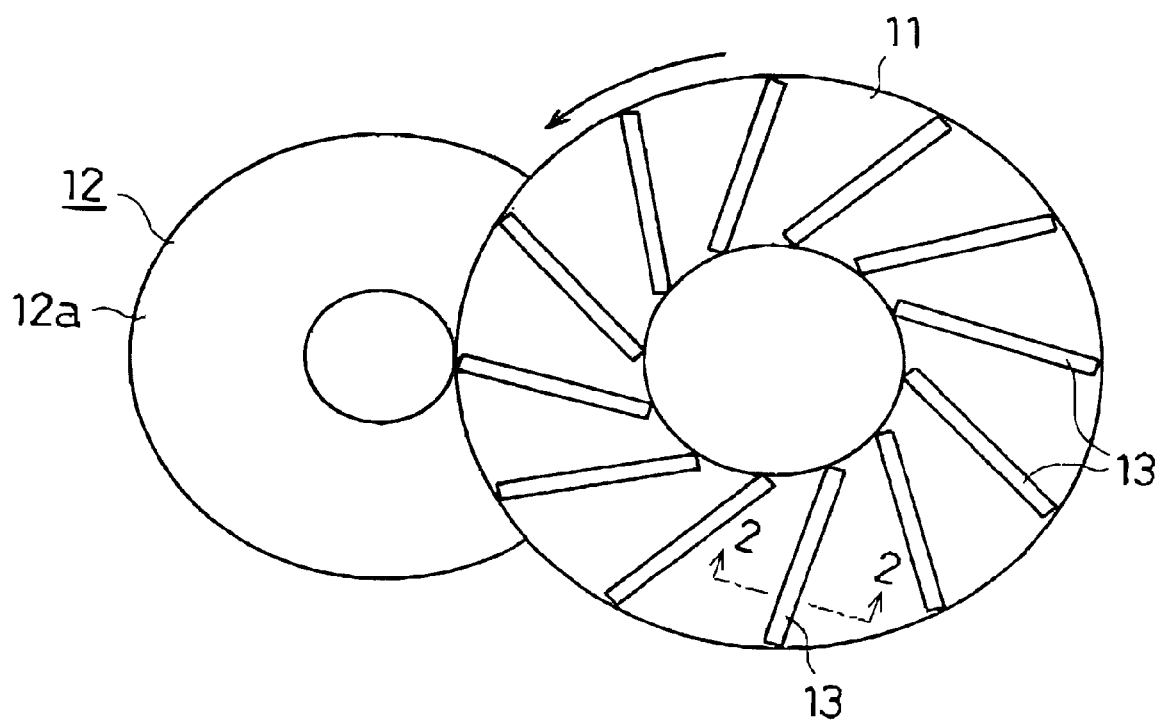
FIG. 1 shows a scrub-etching step in a second embodiment of the present invention.

A substrate made of an inorganic material or a substrate on which a nickel-phosphorus alloy film has been previously formed, may be used for magnetic disks. The substrate undergoes an immersion treatment or a scrub process under various conditions using acid solution. The acid solution treatment is repeated several times. The resulting substrate has a fine texture having a very uniform surface roughness.

Glass, crystallized glass, ceramics or metal such as aluminum, may be used as the substrate material. The acid solution for the surface treatment may be, for example, hydrofluoric acid, sulfuric acid, nitric acid, phosphoric acid or hydrochloric acid. The acid solution treatment includes an immersion treatment and a scrub process. In the immersion treatment, the substrate is immersed in the acid solution under predetermined conditions. In the scrub process, namely, scrub-etching, the surfaces of the substrate material are etched while being scrubbed with a pad that has a lower degree of hardness than that of the substrate material.

In the field of surface science, it is commonly known that a surface layer of solid and a bulk layer located at deep portion than the surface layer are different in chemical composition, physical structure and mechanical structure. Typically, in the depth direction and in a direction parallel to the surface, the surface layer has a non-uniform composition and structure, whereas the bulk layer often has a uniform composition and structure.

The occurrence of asperity and inferior reproducibility are prominent when the etching depth is shallow. Because of this, it is thought that the occurrence of asperity and inferior reproducibility result from the irregularity of the composition and/or structure near the top surface layer of the glass substrate. It appears that the depth of the non-uniform top surface layer is at least about 50 nm. That is to say, the irregularity near the surface causes a difference in configuration among newly formed textures even when etching is performed with the same chemical and under the same conditions.

On the other hand, even in a solid surface that is chemically, physically, mechanically uniform and that has the same composition and structure in the depth direction as the bulk layer of the solid surface, if different types of chemicals are used in etching or if the concentration or treatment temperature in etching varies, even with the same chemicals, the etching mechanism or etching rate on the solid surface varies. Also, inorganic materials may have a two-phase or multi-phase structure.

Such a plurality of phases vary largely in composition and structure and the size. For example, there is a phase separation by spinodal decomposition in glass; a crystalline phase and a glassy phase in crystallized glass; crystal grain and grain boundary surrounding the crystal grains regarding ceramics consisting of polycrystal; and a polycrystal phase composed of two phases or more in metal such as alloy. Therefore, if a solid material consists of a plurality of phases which have a significant difference in the etching rate with respect to the conditions of a certain acid treatment, when the solid surface undergoes the acid treatment, the solid surface is unevenly etched due to the difference in etching rate, thus resulting in the formation of a texture.

For this reason, due to the difference in etching mechanism and etching rate on the surfaces of a solid material associated with a particular treatment solution and a two-phase to multi-phase structure possessed by the solid material itself as described above, textured surfaces having variations in roughness and configuration are formed.

For example, when glass having a composition of many components undergoes an acid treatment, typically, the components most sensitive to acid initially dissolve. Based on this property, the glass material and the acid treatment conditions are selected to increase the difference in dissolving speed between parts resistant and parts sensitive to the acid in the glass. Then, the glass surfaces dissolve irregularly, so that a texture is formed and grown on the surfaces of the glass substrate. Conversely, when the glass material and the acid treatment conditions are selected to decrease the difference in dissolving speed between parts resistant and parts sensitive to the acid in the glass, the glass surface dissolves more evenly and uniformly. Thus, a flat or fine texture is formed. As explained above, by selecting an etching mechanism that varies depending on the reactivity of the glass material with the acid, textured surfaces having variations in roughness or configuration can be formed.

The acid treatment is separately performed two or more times for two purposes. A first purpose is to consistently remove a layer having a non-uniform composition and structure, which may lead to asperity and inferior reproducibility of texture roughness, or to form an alteration layer, or to simultaneously perform this removal and formation.

For achieving the first purpose, the composition, concentration and treatment temperature of the treatment solution are appropriately selected. Preferably, when a smoothly polished substrate having an average surface roughness Ra of 1 nm or less is etched to a range between X and X+Ynm (wherein X>0, 50<Y<10,000), the average surface roughness Ra converges on a specified value within a range from 0.1 to 2.6 nm. This is because the control for configuration and roughness of the fine texture is facilitated in a second purpose.

The second purpose is to unequally etch the substrate surface for controlling the texture roughness to a desired roughness. To achieve the second purpose, the composition, concentration and temperature of the treatment solution are appropriately selected. A smoothly polished substrate, which is to be treated by the acid treatment of the second purpose, preferably has an average surface roughness Ra of 1 nm or less or has a specified Ra value converged by the acid treatment of the first purpose. The acid treatment of the second purpose is achieved by etching the above substrate by at least 5 nm or more. It is preferable that the Ra value after etching is 0.4 nm or more larger than the Ra value before the etching of the second purpose.

The composition, concentration and treatment temperature of the treatment solution are appropriately selected in terms of the acid resistance of the substrate and whether the acid treatment is for the first purpose or the second purpose.

Regarding the order of the acid treatments having the first and second purposes, for the control of configuration or roughness of the fine texture to be formed, most preferably, the acid treatment of the second purpose is performed after the acid treatment of the first purpose is performed at least one time. However, the order of performing the acid treatments may be reversed. Alternatively, the acid treatments having the first and second purposes may be alternately performed in several times.

In using a hydrofluoric acid, which has a significant etching effect on the glass, the preferred concentration is in a range between 0.001 and 1 wt %. The preferred concentration in the acid treatment for the first purpose is in a range between 0.01 and 1 wt %. The preferred concentration in the acid treatment for the second purpose is in a range between 0.001 and 0.5 wt %. Particularly, in etching an aluminosilicate glass, the concentration of the acid treatment for the first purpose is preferably in a range between 0.02 and 1 wt %, and the concentration of the acid treatment for the second purpose is preferably in a range between 0.005 and 0.1 wt %. Furthermore, the acid concentrations of sulfuric acid, nitric acid, phosphoric acid and the like, are specified in a range between 0.01 and 5 wt %.

On the other hand, a glass appropriate for forming textured surfaces of various roughnesses under the aforementioned conditions of the acid treatment is required to readily permit selective dissolution of certain components thereof through the acid treatment. Preferably, such glass has an etched depth ranging from 50 nm or more to 10,000 nm or less after undergoing the immersion treatment in a 0.1 wt % aqueous hydrofluoric acid solution at 50° C. for 2.5 minutes. If the etched depth is less than 50 nm, a certain component sensitive to acid in the glass is resistant to selective dissolution by the acid treatment. Therefore, even when the acid treatment of the second purpose is performed, it is difficult to form and grow a texture within a range of predetermined roughness. Conversely, if the etched depth exceeds 10,000 nm, the selective dissolution of a certain component sensitive to acid in the glass is easily carried out by the acid treatment. Therefore, a surface having a target flatness or a finely textured surface cannot be produced even though the acid treatment of the first purpose is performed, or else the formation and control of the texture within a range of target roughness becomes difficult even though the acid treatment of the second purpose is performed.

In typical glass exhibiting the etching rate of 50 nm or more, the quantity of $SiO_2$ ranges preferably from 40 to 75 wt %, the quantity of $R_2O$ (R=Li, Na, K) preferably ranges from 5 to 25 wt %, and the quantity of MO (M=divalent metal ion such as Mg, Ca, Sr) preferably ranges from zero to 35 wt %. In addition, besides the above major components, other components may be included as required.

When the glass substrate is treated with hydrofluoric acid or a multi-component acid solution including hydrofluoric acid, a hardly soluable or insoluable foreign substance might precipitate in the acid solution and contaminate the surfaces of the glass substrate. This is undesirable because it causes gliding error. Hence, preferably, the glass has fewer components, such as CaO, MgO, that react with hydrofluoric acid to form fluoride, which has a very low solubility. For this reason, in treatments using hydrofluoric acid, the CaO quantity in the glass is preferably 10 wt % or less and the MgO quantity is preferably 15 wt % or less.

When an aluminosilicate glass is used, the following composition (wt %) is desirable. Aluminosilicate glass having the following composition will hereinafter be called "aluminosilicate glass" (1).

| | |
|---|---|
| silicon dioxide ($SiO_2$) | 58 to 70% |
| aluminum oxide ($Al_2O_3$) | 9 to 22% |
| lithium oxide ($Li_2O$) | 2 to 10% |
| sodium oxide ($Na_2O$) | 4 to 13% |
| potassium oxide ($K_2O$) | 0 to 5% |
| magnesium oxide (MgO) | 0 to 4% |
| calcium oxide (CaO) | 0 to 7% |
| strontium oxide (SrO) | 0 to 2% |
| barium oxide (BaO) | 0 to 2% |
| titanium dioxide ($TiO_2$) | 0 to 2% |
| cerium oxide ($CeO_2$) | 0 to 2% |
| iron oxide ($Fe_2O_3$) | 0 to 2% |
| manganese dioxide (MnO) | 0 to 1% |
| zirconium dioxide ($ZrO_2$) | 0 to 7% |

The percentages of the above components are adjusted such that the total of respective components does not exceed 100.

Such aluminosilicate glass is fabricated by, for example, a float technique. In the float technique, a heated bath contains molten tin and has an upper area of a reducing atmosphere. Molten glass flows into the bath from one end thereof, and the glass is stretched from the other end, which produces plate-shaped glass. The resulting glass has a low melting temperature and has superior water resistance and weatherability after the chemical reinforcing treatment. Also, the glass has an expansion coefficient allowing its use in combination with metal products.

The glass substrate and the aluminosilicate glass substrate, which have the aforementioned compositions, may undergo a chemical reinforcing treatment. In the chemical reinforcing treatment, the surface of the substrate undergoes ion exchange in molten salt including potassium, sodium or both, which generates compression stress on the surface. The durability of the fine texture is improved through the chemical reinforcing treatment. After the fine texture is formed, the chemical reinforcing treatment may be carried out on the substrate.

Preferably, the substrate is polished just before the acid treatment to have an Ra value of 1 nm or less. This is because the texture of the substrate surfaces before the acid treatment has little effect on the result of the acid treatment due to the polishing, so that the control of roughness or configuration of the fine texture is facilitated. However, even if the Ra value of the substrate before the acid treatment is 1 nm or more, the depth of etching may be increased to reduce the texture of the substrate surfaces before the acid treatment, so that roughness Ra of the substrate surface before the acid treatment is 1 nm or more.

Between one acid treatment step and the next acid treatment step and after the final acid treatment step, a step of immersion-cleaning or scrub-cleaning with a neutral or alkaline solution may be included. This is for removing reaction products, contamination and foreign matter which are deposited on the substrate surfaces during the acid treatment step. Alternatively, the cleaning may be for removing an alteration layer different from the bulk layer, which may have grown on the top surface layer of the substrate in the acid treatment step. Alternatively, the cleaning may be for preventing contamination of the acid solution. Specifically, the acid solution remaining on the substrate surfaces by an nth acid treatment step (n is an integer equal to or more than 1) is cleaned off prior to an (n+1)th acid treatment step that uses an acid solution having a different composition or concentration from that in the nth acid treatment step. In other words, the cleaning step prevents contamination of the acid solution in the (n+1)th acid treatment step with the acid solution of the nth acid treatment step.

When a substrate material is a glass or a crystallized glass, it is desirable to perform the immersion-cleaning or scrub-cleaning with an alkaline solution at least one or more times after the final acid treatment step.

A purpose of the alkaline treatment is to remove a leaching layer (a layer formed by selectively eluting a component apt to dissolve in acid while maintaining the glass skeletal component) remaining on the surfaces of glass substrate or crystallized glass substrate by the acid treatment. The alkaline treatment prevents the deposition of a foreign substance consisting of an alkaline metal salt on the resulting substrate surfaces and reduces the diffusion of alkali metal into a multi-layer film formed on the substrate. The occurrence of asperity and the depositions of foreign matter, consisting of carbonate of alkali metal and the like, on the substrate surface on which the fine texture is formed is limited by the alkaline treatment.

The composition and concentration of the neutral solution or alkaline solution is not limited, and may be selected from, for example, commercially available neutral detergents or alkaline detergents. An alkaline solution having an alkali component, a surface active agent and a chelating agent as the major constituent or a neutral solution having a surface active agent and a chelating agent as the major constituent is preferred.

Sodium hydroxide, potassium hydroxide, tetramethylammonium hydroxide, sodium carbonate, or potassium carbonate may be used as the alkali component.

Possible surface active agent are as follows: a nonionic surface active agent such as polyoxyethylene alkyl ether and a polyoxyethylene derivative; a quaternary ammonium salt such as lauryl trimethyl ammonium chloride; a higher amine halogenide such as cured tallow amine; a cation surface active agent, such as dodecylpyridinium chloride; an anion surface active agent, such as sodium alkylsulfuric ester, fatty acid sodium, alkylaryl sulfonate and so on; and an ampholytic surface active agent, such as amino acid salts such as sodium laurylamino propionate.

Possible chelating agents are dimethylglyoxime, dithizone, oxine, acetylacetone, glycine, ethylenediaminetetraacetic acid (EDTA), and nitrilotriacetic acid (NTA).

The concentrations of the respective alkali component, surface active agent and chelating agent are not limited. For example, the alkali component is used in a range between 0.001 and 5 wt %, the surface active agent is used in a range between 0.001 and 1 wt %, and the chelating agent is used in a range between 0.001 and 1 wt %.

Treating means, such as the radiation of a laser beam, may be performed additionally on a specific area of the substrate, which has been formed with a fine texture without asperity, to form a new texture. Regarding the laser beam, a YAG laser, which is a relatively inexpensive apparatus and has high power, is desirable. The wavelength of the laser beam may be changed to one half or one quarter.

A glass having a light absorption coefficient at wavelength of 266 nm of a laser beam in a range between 20 and 2000 $mm^{-1}$ is desirable, since this glass can accurately form a new texture. Projections formed by the radiation of the laser beam are approximately uniformly arranged, and each projection has a circular plane shape. The projection has, for example, a height in a range between 5 and 100 nm, a diameter in a range between 1 and 20 $\mu$m, and a space between projections in a range between 1 and 100 $\mu$m.

Next, on the resulting substrate surface, an underlying layer, a magnetic layer and a protective layer are sequentially formed by, for example, sputtering, to fabricate a magnetic recording medium. Specifically, the underlying layer may include chrome-molybdenum; the magnetic layer may include cobalt-platinum-chrome-tantalum; and the protective layer may include a carbon layer. Moreover, a lubricating layer may be formed on the protective layer using a perfluoropolyether based lubricant.

According to the first embodiment as described above, the following effects are obtained.

The immersion treatment or scrub processing is repeatedly performed under different conditions using the acid solution, which reliably forms a fine texture free of asperity in which the average surface roughness Pa is in a range between 0.4 and 3.0 nm and the ratio of the 10-point mean roughness (Rz: explained in more detail below) to the average surface roughness (Ra) is 14 or less. Moreover, such substrates can be reproduced without difficulty.

If magnetic disks are manufactured using the substrates after the chemical cleaning and the scrub cleaning including the acid treatment according to the invention, the magnetic disk can be fabricated with a higher yield and less gliding errors.

The roughness of the fine texture can be delicately and precisely controlled. Thus, a substrate for a magnetic disk and a magnetic disk having a fine texture can be produced to fit the design specifications of the head-disk-interface, which differs from each the hard disk device manufacturers.

Another treatment using a neutral solution or an alkaline solution may be performed to remove reaction product, contamination and foreign matter deposited on the substrate surface during the acid treatment step, to remove an alteration layer growing in the top surface layer of the substrate, and to prevent the substrate surface from contamination by acid solution.

Immersion treating a glass substrate that was etched to a depth between 50 nm and 10,000 nm in a 0.1 wt % aqueous hydrofluoric acid solution at 50° C. for 2.5 minutes controllably permits the formation of textured surface having desirable roughness through the acid treatment.

Since glass having calcium oxide (CaO) content of 10 wt % or less and magnesium oxide (MgO) content of 15 wt % or less is employed, it is possible to reduce the deposition of hardly soluable/insoluable foreign matter, to prevent the surface of glass substrate from contamination, and to avoid the occurrence of gliding error.

Means, such as laser beam radiation, may be performed additionally on a specific area of the substrate surface having the fine texture, to form a new texture that is rougher than the fine texture.

A substrate for a magnetic disk that has a required texture on its surfaces can be manufactured, and layers for a recording medium, such as an underlying layer, a magnetic layer and a protective layer, are formed on the surfaces of the substrate, resulting in magnetic recording media useful as hard disks or the like.

The first embodiment will be explained below in further detail using examples and comparisons.

EXAMPLE 1

Using, a 2.5-inch glass substrate, which was produced by chemically reinforcing a substrate made of aluminosilicate glass (1), the difference of the surface structures through various surface topology was checked.

<Process A>

The glass substrate surfaces were precisely polished to obtain an Ra value ranging from 0.3 to 0.6 nm. Thereafter, the substrate was scrub-cleaned with pure water.

<Process B>

The resulting glass substrate was immersed and swung in a 0.1 wt % aqueous hydrofluoric acid solution at 50° C. for 2.5 minutes. Chemicals on the surface were then removed by rinsing with hot pure water.

<Process C>

Subsequently, the glass substrate was immersed and swung in a 0.03 wt % aqueous hydrofluoric acid solution at 50° C. for 20 minutes. Chemicals on the surface were then removed by rinsing with hot pure water.

<Process D>

Subsequently, the glass substrate was immersion-cleaned in an aqueous potassium hydroxide solution adjusted to pH 11 for 30 seconds while being irradiated with ultrasonic waves. Then, the substrate was scrub-cleaned. The glass substrate was again immersion-cleaned in an aqueous potassium hydroxide solution adjusted to pH 11 for 160 seconds while being irradiated with ultrasonic waves. Then, the substrates was repeatedly immersed in a pure water bath for rinsing. The glass substrate was then immersion-cleaned in an isopropyl alcohol bath while being irradiated with ultrasonic waves. Finally, the glass substrate was dried in an isopropyl alcohol steam for one minute, and the resulting product was used as a sample of Example 1.

EXAMPLE 2

Processes A and B were carried out in a manner similar to Example 1. Thereafter the glass substrate was immersed and swung in a 0.03 wt % aqueous hydrofluoric acid solution at 50° C. for 40 minutes and then rinsed with hot pure water to remove chemicals. Subsequently, process D was carried out as in Example 1. The above processes were repeated three times (#1, #2, #3), and the average values and standard deviations of Ra and Rz/Ra were determined. The resulting product was used as a sample of Example 2.

EXAMPLE 3

Processes A and B were carried out in a manner similar to Example 1. Thereafter, the glass substrate was immersed in a 0.01 wt % aqueous hydrofluoric acid solution at 50° C. for 30 minutes and then rinsed with hot pure water to remove chemicals.

Subsequently, the substrate was immersion-cleaned in a 0.1N potassium hydroxide solution for 2.5 minutes and then rinsed with hot pure water and pure water. The substrate was then immersion-cleaned in isopropyl alcohol while being irradiated with ultrasonic waves. Finally, the substrates was dried in an isopropyl alcohol steam for one minute. The resulting product was used as a sample of Example 3.

EXAMPLE 4

A 2.5-inch glass substrate made of aluminosilicate glass (1) was used. This glass substrate was not chemically reinforced. The surface of the glass substrate was precisely polished to obtain an Ra in a range between 0.3 and 0.6 nm. Then, the substrates was scrub-cleaned with pure water.

Subsequently, an acid treatment as in process B in Example 1 was carried out. Then, the glass substrate was immersed in a 0.03 wt % aqueous hydrofluoric acid solution at 50° C. for 30 minutes and rinsed with hot pure water to remove chemicals. Next cleaning in an aqueous potassium hydroxide solution was performed in a manner similar to Example 3, and the resulting product was used as a sample of Example 4.

COMPARATIVE EXAMPLE 1

Processes A and B were performed in a manner similar to Example 1. Subsequently, process C was not performed and process D was performed.

COMPARATIVE EXAMPLE 2

Process A was performed in a manner similar to Example 1. Subsequently, the glass substrate was immersed and swung in a 0.01 wt % aqueous hydrofluoric acid solution at 50° C. for 0.3 minutes and rinsed with hot pure water to remove chemicals. Subsequently, process C was not performed and process D was performed.

COMPARATIVE EXAMPLE 3

Process A was performed in a manner similar to Example 1. Subsequently, the glass substrate was immersed in a 0.01 wt % aqueous hydrofluoric acid solution at 50° C. for 30 minutes and rinsed with hot pure water to remove chemicals. Next cleaning in an aqueous potassium hydroxide solution was performed in a manner similar to Example 3, and the resulting product was used as a sample of Comparative Example 3.

COMPARATIVE EXAMPLE 4

Process A was performed in a manner similar to Example 1. Subsequently, the glass substrate was immersed and swung in a 0.005 wt % aqueous hydrofluoric acid solution at 50° C. for 2.5 minutes and rinsed with hot pure water to remove chemicals. Then, the substrates was scrub-cleaned. Process D was then performed in a manner similar to Example 1. The processes were repeated three times (#1, #2, #3). The resulting product was used as a sample of Comparative Example 4.

(Evaluation of Fine Texture Configuration)

Examples 1 to 4 and Comparative Examples 1 to 4 were examined in a field of view of 10 $\mu$m×10 $\mu$m with a scanning probe microscope (trade name: Nanoscope III, manufactured by Digital Instrument Co., Ltd.), and the average surface roughness Ra was found. Then, an asperity ratio (Rz/Ra) was found by dividing the 10-points mean roughness Rz by the average surface roughness Ra. The asperity ratio (Rz/Ra) is an index that approximately indicates an existence rate of the relatively high projections, which exists in projections having average height. Greater the asperity ratio (Rz/Ra) indicates higher the asperity and/or greater the existence density. Definition of the asperity ratio is described below in detail. The resulting values are shown in Table 1 and Table 2. All the fine textures of the measured samples had a texture configuration with isotropy and continuity having no substantially flat parts between pits or projections.

TABLE 1

| No. | Ra (nm) | Rz/Ra | chemical reinforcement | 1st.HF treatment condition | 2nd.HF treatment condition |
|---|---|---|---|---|---|
| Ex. 1 | 1.10 | 10.8 | applied | 0.1 wt %/50° C./ 2.5 min | 0.03 wt %/ 50° C./20 min |
| Ex. 2 | 2.04 | 10.1 | applied | 0.1 wt %/50° C./ 2.5 min | 0.03 wt %/ 50° C./40 min |
| Ex. 3 | 0.80 | 10.6 | applied | 0.1 wt %/50° C./ 2.5 min | 0.01 wt %/ 50° C./30 min |
| Ex.4 | 2.06 | 9.6 | not applied | 0.1 wt %/50° C./ 2.5 min | 0.03 wt %/ 50° C./30 min |
| Comp. Ex. 1 | 0.59 | 14.2 | applied | 0.1 wt %/50° C./ 2.5 min | — |
| Comp. Ex. 2 | 0.53 | 19.4 | applied | 0.1 wt %/50° C./ 0.3 min | — |
| Comp. Ex. 3 | 1.47 | 15.5 | applied | 0.01 wt %/50° C./ 30 min | — |

TABLE 2

| No. | Ra (nm) | Rz/Ra | 1st.HF treatment condition | 2nd.HF treatment condition |
|---|---|---|---|---|
| Ex. 2 | | | | |
| #1 | 2.01 | 10.0 | 0.1 wt %/50° C./ | 0.03 wt %/50° C./ |
| #2 | 2.15 | 10.0 | 2.5 min | 40 min |
| #3 | 1.95 | 10.4 | | |
| av. | 2.04 | 10.1 | — | — |
| std. dv. | 0.10 | 0.02 | — | — |
| Comp. Ex. 4 | | | | |
| #1 | 2.20 | 16.7 | 0.005 wt %/50° C./ | — |
| #2 | 1.50 | 18.3 | 2.5 min | |
| #3 | 1.90 | 15.9 | | |
| av. | 1.87 | 17.0 | — | — |
| std. dv. | 0.35 | 1.22 | — | — | std. dv.: standard deviation

As shown in Table 1 and Table 2, all samples of Examples 1 to 4 had an asperity ratio (Rz/Ra) of around 10, and glass substrates having various Ra values could be manufactured.

A fine texture, which has relatively small asperity ratio (Rz/Ra) of around 10, is formed in each of Examples 1 to 4. Each of the asperity ratios in the Examples 1 to 4 is not related to corresponding Ra value, compared with the Comparative Examples 1 to 4.

As shown in Table 2, the Ra values of Example 2 are similar with those of Comparative Example 2. Example 2 has smaller standard deviations of both the Ra values and the asperity ratio (Rz/Ra) than those of Comparative Example 2. Accordingly, Example 2 according to the present invention has superior reproducibility of forming a fine texture than Comparative Example 2.

The first embodiment may be modified as follows.

The aforementioned treatment using a neutral solution or alkali solution may be performed during the scrub process. According to this modified method, the cleaning treatment with a neutral solution or alkali solution can be reliably performed.

A plurality of the aforementioned treatments with an acid solution may be performed in combination with the immersion treatment and the scrub processing.

Second Embodiment

A second embodiment according to the present invention will be explained in detail. In a glass substrate of the second embodiment, a fine texture without asperity is isotropically formed on the surface of the substrate. The texture is formed by scrub-etching the surfaces of the substrate material.

A glass substrate for magnetic disks includes, from bottom to top, an underlying layer, a magnetic medium layer, a protective layer and a lubricating layer, all for improving the magnetic properties. In order to further improve the magnetic properties and to increase the adhesive force, a plurality of intermediate layers may be formed between the glass substrate and the underlying layer.

In the presence of an acid treatment solution, the surface of the glass substrate material is scrub-etched by friction body, which is a pad in this embodiment. Hydrofluoric acid, sulfuric acid, phosphoric acid, nitric acid and hexafluorosilicic acid can be used as the acid treatment solution. To enhance the performance of scrub-etching, a surface active agent and a chelating agent, such as ethylenediaminetetraacetic acid and nitrilotriacetic acid, can be added to the acid treatment solution. The additive is added in a range between 0.001 arid 10 wt % of the treatment solution.

Methods of supplying the acid treatment solution to the surface of glass substrate material include the following three types.

(1) A method for wholly or partially immersing the glass substrate material in the acid treatment solution.

(2) A method for spraying the acid treatment solution on the surface of glass substrate material.

(3) A method for supplying the acid treatment solution to the surface of glass substrate material by impregnating the pad with the acid treatment solution in advance.

Among these methods, employment of method (1) is preferred to minimize the spraying and volatilization of the acid treatment solution. Employment of method (3) is preferable for forming a fine texture on the surface of glass substrate material without creating asperity. Accordingly, it is more preferred to scrub-etch the surface of glass substrate material with a pad in acid treatment solution.

Figure 3A:
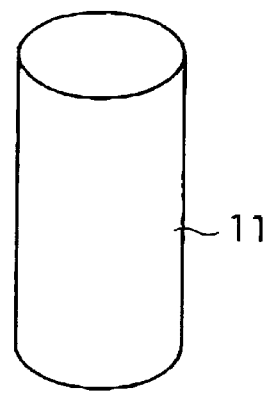
FIG. 3A is a perspective view of a cylindrical pad for the scrub-etching.
Figure 3B:
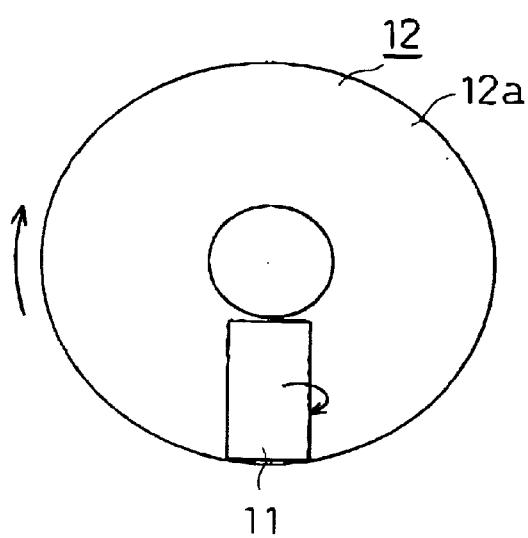
FIG. 3B and FIG. 3C show a scrub-etching step using the pad shown in FIG. 3A.
Figure 3C:
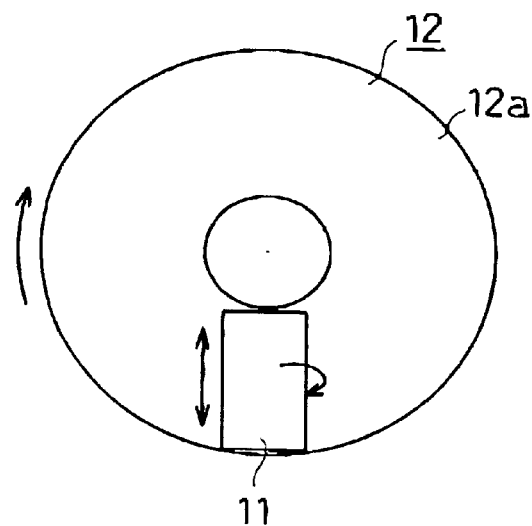

Materials for the pad should have a lower hardness and a lower resistance to the acid treatment solution than those of the substrate material. For example, organic materials such as synthetic resin, inorganic materials, metallic materials and any composite thereof can be used. As shown in FIG. 3A, a pad 11 is formed, for example, in a cylindrical shape. The length of the pad 11 approximately corresponds to the width (length subtracting the inner diameter from the diameter) of the annular-shaped glass substrate material 12. As shown in FIG. 3B, the pad 11 is placed radially with respect to the substrate material 12. The pad 11 is rotated and slides on the surface of the rotating substrate material 12. In this way, the surface of substrate material 12 is rubbed (or scrubbed) by the pad 11. As shown in FIG. 3C, the pad 11 may be swayed in a radial direction of the substrate material 12.

Figure 4A:
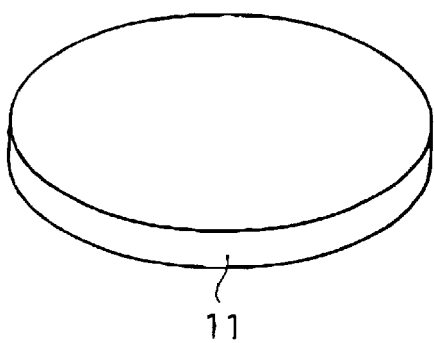
FIG. 4A is a perspective view of a circular pad for the scrub-etching.
Figure 4B:
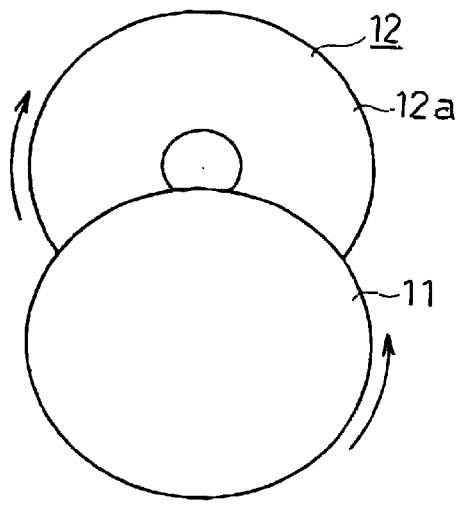
FIG. 4B to FIG. 4D show scrub-etching steps using the pad shown in FIG. 4A.
Figure 4C:
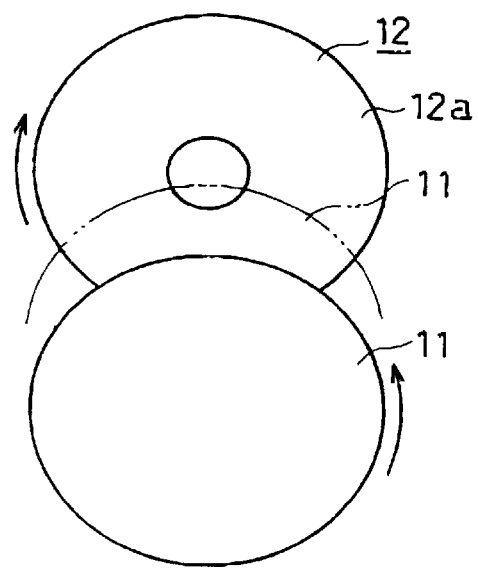
Figure 4D:
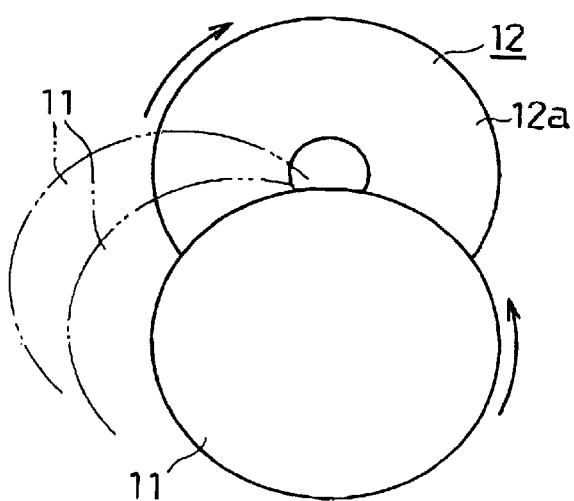

Alternatively, as shown in FIG. 4A, the pad 11 may be circular with a diameter similar to that of the substrate material 12. In this case, as shown in FIG. 4B, the pad 11 is placed over the surface of substrate material 12, and is rotated in the direction opposite to that of the substrate material 12. As shown in FIG. 4C, the pad 11 may be swayed in a radial direction of the substrate material 12. Alternatively, as shown in FIG. 4D, the pad 11 may be revolved along the substrate material 12 as indicated by broken lines. The substrate material 12 is thus rubbed (or scrubbed) by the pad 11.

In each of FIGS. 3A to 4D, the substrate material 12 may be stationary or may be rotated independently of movements of the pad 11.

The surface of pad is formed with a fiber-like material, a bulk material, a porous bulk material, or a composite thereof. The shape of the pad is optional insofar as a 0.8 to 3.5-inch diameter substrate material can be scrub-etched, but the following shapes are preferred.

With a circular pad, the diameter is in a range between 20 and 150 mm, and the thickness is in a range between 3 and 20 mm. When the thickness of the pad is under 3 mm, the rigidity is insufficient, which causes non-uniform contact between the pad and the substrate, which increases the likelihood of asperity. On the other hand, when the thickness exceeds 20 mm, the manufacturing cost of the pad rises without corresponding improvement in effect. A texture having optional configuration and size may be formed on the surface of circular pad, and a hole for fixing the pad to a rotating shaft may be opened in a central portion of the circular pad.

If a cylindrical pad is used, the diameter is preferably in a range between 8 and 40 mm, and the height is in a range between 10 and 100 mm. A texture having a desired configuration and size may be formed on the circumferential surface of the cylindrical pad, and a hole for fixing the pad to a rotating shaft may be opened in a central portion of the cylindrical pad in the axis direction.

The contact pressure between the pad and the glass substrate is preferably in a range between 1 and 5000 g/cm². If the pad is circular, the contact pressure is preferably between 100 and 400 g/cm². When the contact pressure is less than 1 g/cm², it takes too much time to remove an asperity. Conversely when the contact pressure exceeds 5000 g/cm², damage to the substrate surface is likely to occur. The rotational speed of the circular pad is preferably in a range between 20 and 4000 rpm, and more preferably, in a range between 20 and 500 rpm. As for a cylindrical pad, the speed is preferably in a range between 200 and 2000 rpm. Exceedingly low and high pad speeds would often cause uneven contact with the substrate. The time of contact between the pad and the substrate material is preferably in a range between 1 and 300 seconds.

Regarding the conditions of scrub-etching, when hydrofluoric acid is used for the acid treatment solution, the concentration is preferably in a range between 0.01 and 1 wt %, the treatment temperature is in a range between 5 and 60° C., and the treatment time is in a range between 1 and 300 seconds. A concentration less than 0.01 wt % is not practical due to the resulting low reaction rate. When the concentration exceeds 1 wt %, foreign matter will readily deposit on the substrate surface, and the scrub-etching system is susceptible to corrosion. Furthermore, to decrease the treatment temperature below 5° C., a large cooling apparatus is additionally needed. When the treatment temperature exceeds 60° C., the volatility of the acid treatment solution increases, control of the concentration becomes more difficult, and an exhaust system is also required.

If the acid treatment solution is a liquid mixture of hydrofluoric acid and sulfuric acid, it is preferred that the concentration of the hydrofluoric acid is in a range between 0.01 and 1 wt %, the concentration of the sulfuric acid is in a range between 0.01 and 1 wt %, the mixing ratio (weight ratio) of the hydrofluoric acid to the sulfuric acid ranges from 1:100 to 100:1, the temperature is in a range between 5 and 60° C., and the treatment time is in a range between 1 and 300 seconds. The aforementioned additive may be added to the acid treatment solution. Regarding the type, concentration and temperature of the acid treatment solution, it is preferred that the conditions are defined so that the pH value is 3 or less, and more preferably, 2 or less, at which pH level the solubility of elements of glass increases. However, a pH value below zero may cause corrosion of the scrub-etching apparatus similar to those encountered when the acid treatment solution has an excessively high concentration.

After the scrub-etching step using the acid treatment solution, an immersion treatment using an alkaline treatment solution is performed. This treatment prevents alkaline metal salt from depositing on the substrate surface. This enhances the corrosion resistance of the substrate. As the alkaline treatment solution, an alkaline metal salt such as potassium hydroxide, a phosphate, a silicate, and aqueous ammonia can be used. The alkaline treatment solution may be blended with the aforementioned additive. Further, it is preferred that the type, concentration and temperature of the above alkaline treatment solution are set so that the alkaline treatment solution has a pH value of 9 or more, at which silicon dioxide ($SiO_2$), i.e., a major constituent of glass, is easily dissolved, and more preferably, 11 or more.

The present inventors performed etching under various polishing and storage conditions, and then inspected the state of substrate surfaces. Experimental data was then collected to show the relationship between the states of the substrate surfaces and the various conditions. According to the experimental data, it is estimated that a mechanical alteration layer having mechanical ununiformity, produced by mechanical deflection during polishing, and a chemical alteration layer having chemical ununiformity, produced by ion exchange with the cleaning treatment before the etching or the storage atmosphere, exist at a depth ranging from 10 to 1000 nm from the top surface of a glass substrate. It was thus concluded that asperity occurred during the etching due to the mechanically and chemically non-uniform alteration layers existing on the surface layer of the substrate.

Another cause of asperity is hardly soluable or insoluable foreign matter produced when the acid treatment solution reacts with the glass. In this case, the hardly soluable or insoluable foreign matter forms the asperity. Alternatively, masking effect by the foreign matter for the etching process may cause a difference in etching rate between an area to which foreign matter is attached and areas having no foreign matter attached.

Scrub-etching reduces the occurrence of asperity and forms a texture free of asperity. During scrub-etching, the surface of a substrate material is etched while being scrubbed with the pad made of resin or the like having a hardness less than that of the substrate material.

The following are reasons for performing scrub-etching:

1) A texture having a desired roughness can be formed by scrub-etching with a treatment solution and conditions appropriate for the particular substrate material.

2) Since the concentration of the treatment solution in the vicinity of the top of an asperity is higher than that in parts where asperity does not occur, the etching reaction progresses selectively, so that asperity is reduced.

3) Foreign matter on the surface of the substrate is removed by the mechanical force of scrubbing.

In the scrub-etching, the diffusion constant of reacted components in the substrate and the acid treatment solution and the initial concentrations of the reacted components are constant at any position in the vicinity of the surface of the substrate regardless of the presence or absence of asperity. However, in the vicinity of the top of the asperity, as compared with the remainder of the substrate, the contact pressure with the pad increases (or the frequency of contact is high), so that the concentration of the reacted components becomes higher. In other words, the reaction rate of etching is high and the substrate material is selectively etched, so that growth of the asperity is inhibited.

Examining the substrate surface with an atomic force microscope (AFM), the asperity exists as relatively higher projections among projections having an average height that occupy most of the measured surface.

Consider, for example, in a group of projections having an average height h1, an asperity having a projection X. The height of the projection X is designated as h2.

The way to most easily define the asperity is to determine its relative height. More specifically, the relative height of the projection X with respect to the group of projections is expressed by the ratio of the height h2 of the projection X to the average height h1 of the projections. Thus, the height rate of the projection X, or the asperity ratio (AR), is represented by the following formula (1).

$$AR=h2/h1$$

The AR in formula (1) is calculated for each asperity. In many cases, one or more asperities exist on the surface of a substrate material, and it is generally difficult to find the average height h1 and the height of each projection h2. Hence, to determine the AR, the height values h1 and h2 are approximated using known and normalized parameters.

The average surface roughness Ra is most suitable to represent h1 and a 10-points mean roughness Rz (explained below) is most suitable to represent h2. Using these parameters, the AR can be expressed by the following formula (2).

$$AR=Rz/Ra \qquad (2)$$

Alternatively, the maximum surface roughness Rmax may be used to represent h2, but it is necessary to take into account that, when a plurality of asperities are present within a measured area, the presence of other asperities having heights lower than the highest will not be reflected in the AR.

The reason why the parameter Rz is more preferable to represent h2 than the parameter Rmax will be described below.

In many cases, asperities having different heights exist within the measured face. If attention is directed to only one highest asperity as the parameter Rmax, the variations in asperity height at different measured areas will affect the measurement. That is, when the AR value is calculated using the Rmax, larger variations will result. On the other hand, by using the Rz, which calculates an average value based on the five highest asperities, the AR value can approximately represent the typical height of an asperity in the measured face. Therefore, locational variations in the AR value may be reduced by using the Rz.

If h2 is limited only to the highest projection in a measuring area, this leads to an imperfection that all values of h2/h1 are 10/3=3.3 even in the following cases 1) to 3) in which the density or height of the asperities are different.

1) A 10 nm projection exists among projections where h1=3 nm;

2) Seven 10 nm projections exist among projections where h1=3 nm; and

3) One 10 nm projection and three 6 nm projections exist among projections where h1=3 nm.

This problem can be contradiction can be considerably reduced by using Rz.

The 10-points mean roughness Rz is expressed within the measured area by the following formula:

Rz=average height of the five highest points of a sample of ten measurements–the average height of the five lowest points in the sample where the average height of the five highest points is an average value of the heights from the highest projection to the fifth highest projection of a ten point sample among all the projections in a measured area, and the average height of the five lowest points is an average value of the heights from the lowest projection to the fifth lowest projection of the ten point sample.

Therefore, if there is no deep pit among the five lowest points in the measured area, Rz is an index that approximately represents the average height from the highest projection to the fifth highest projection.

The measurement of roughness including the asperity in this embodiment is performed by measuring the substrate surface with a tapping mode AFM. The roughness of the asperity is taken in a measured area ranging from 5 $\mu$m (width)×5 $\mu$m (length) to 20 $\mu$m (width)×20 $\mu$m (length). The average surface roughness Ra and the 10-points mean roughness Rz, which are used in calculating the AR, are three-dimensionally extended so that the average surface roughness Ra and the 10-points mean roughness Rz defined by JIS (Japan Industrial Standard) B0601 are applied with respect to the above measured area. Ra is defined by the following formula (3).

$$Ra = \frac{1}{n} \times \sum_{i=1-n} |Z_i - Z_0| \qquad (3)$$

where, $$Z_0 = \frac{1}{n} \times \sum_{i=1-n} Z_i$$

and n is the number of data points for the AFM, and $Z_i$ is an ith AFM data value.

It is assumed that the number of data points defined in the measured area is 65536 points or more (256 points per width side and length side).

Ra of the glass substrate of the second embodiment ranges from 0.4 to 3.0 nm and has an AR of 14 or less. The glass substrate is suitable for use in a magnetic storage unit of a ramped loading type drive, in which the magnetic head is retracted in a position out of being contact with the magnetic disk when the magnetic disk is not operated, a contact type, in which the magnetic head is kept in contact with a magnetic disk, or a CSS type. This sustrate simultaneously solves the problems of higher density and adhesion.

Next, the composition of the glass of the substrate will be explained below.

Glass suitable for the substrate includes an aluminosilicate glass, a crystallized glass and a soda-lime glass, of which the aluminosilicate glass having the following composition (mol%) is preferable.

| | |
|---|---|
| silicon dioxide ($SiO_2$) | 40 to 72% |
| aluminum oxide ($Al_2O_3$) | 0.5 to 25% |
| lithium oxide ($Li_2O$) | 0 to 22% |
| sodium oxide ($Na_2O$) | 0 to 14% |
| potassium oxide ($K_2O$) | 0 to 10% |
| magnesium oxide (MgO) | 0 to 25% |
| calcium oxide (CaO) | 0 to 25% |
| strontium oxide (SrO) | 0 to 10% |
| barium oxide (BaO) | 0 to 10% |
| titanium oxide ($TiO_2$) | 0 to 10% |
| zirconium oxide ($ZrO_2$) | 0 to 10% |

The quantities of $Li_2O$, $Na_2O$ and $K_2O$ are adjusted to form $R_2O$ (total of $Li_2O$, $Na_2O$ and $K_2O$) in a range between 2 and 30%.

The quantities of MgO, CaO, SrO and BaO are adjusted to form RO (total of MgO, CaO, SrO and BaO) in a range between zero and 40%.

The quantities are adjusted so that the sum of the listed components amounts to 95% to 100% in the glass. The remaining components are not limited and may include trace element and/or impurities.

Glass having the above composition can be fabricated by a float technique and has a low melting temperature, a high degree of water resistance, weatherability, after the chemical reinforcing treatment, and an expansion coefficient that allows the glass to be used in combination with metal products. In the float method, a bath contains molten tin and has a reducing atmosphere. Molten glass is introduced into the bath from one end thereof, and the glass is stretched from the other end to manufacture plate-shaped glass. According to the float method, the resulting glass has parallel surfaces without distortion, surface gloss is capable of mass-production. In the float method, automation is facilitated, and the width of the glass is easily changed.

In the aforementioned glass composition, $SiO_2$ is a major component and an essential constituent of the glass. If the $SiO_2$ content is less than 40 wt % the water resistance would decrease after the ion exchange of the reinforcing treatment. On the other hand, if the $SiO_2$ content exceeds 72 wt % the viscosity of molten glass would be too high, causing difficulties in melting and molding, and the coefficient of expansion would be too small.

$Al_2O_3$ is required to increase the ion exchange speed and to improve the water resistance of the glass after the ion exchange. If the $Al_2O_3$ content is less than 0.5 wt % such effects are insufficient. On the contrary, if the $Al_2O_3$ content exceeds 25 wt % the viscosity of molten glass would be too high, and the coefficient of expansion would be too small.

$Li_2O$ is an essential constituent for ion exchange and for increasing solubility. If the $Li_2O$ content exceeds 22 wt % the water resistance after the ion exchange would be too low, and the liquid phase temperature would increase, causing difficulties in molding.

$Na_2O$ increases solubility. If the $Na_2O$ content exceeds 14 wt % the water resistance after the ion exchange would decrease. $K_2O$ increases solubility. If the $K_2O$ content exceeds 10 wt % the surface compression stress after the ion exchange would decrease.

Moreover, when $R_2O$ (the total of $Li_2O$, $Na_2O$ and $K_2O$) is less than 2 wt %, the viscosity of the molten glass liquid is too high, causing difficulties in melting and molding, and the coefficient of expansion is too low. On the contrary, if the $R_2O$ content exceeds 30 wt % the water resistance after the ion exchange is too low.

MgO increases solubility. If the quantity of MgO exceeds 25 wt %, the liquid phase temperature would increase, which causes difficulties in molding. CaO increases solubility and adjusts the speed of ion exchange. If the quantity of the CaO content exceeds 25 wt %, the liquid phase temperature would increase, which causes difficulties in molding. SrO increases solubility and decreases the liquid phase temperature. If the SrO content exceeds 10 wt % the density of the glass would increase, and the manufacturing costs would be higher. BaO increases solubility and decreases the liquid phase temperature. If the BaO content exceeds 10 wt % the density of the glass would increase, and the manufacturing cost would be higher. When RO (the total of MgO, CaO, SrO and BaO) exceeds 40 wt %, the liquid phase temperature increases, thus resulting in difficulties in molding.

If the $TiO_2$ content exceeds 10 wt % the quality of the glass would deteriorate, and the manufacturing costs would increase. If the $ZrO_2$ content exceeds 10 wt % the melting temperature or the viscosity of the glass would increase, and the manufacturing of the glass substrate material would become more difficult.

Preferably, the glass is subjected to a chemical reinforcing treatment on its surfaces for achieving the required strength. In the chemical reinforcing treatment, glass is immersed in molten salt containing monovalent metal ions, each having an ion radius larger than that of monovalent metal ions included in the composition of the glass. Through the immersion, metal ions in the glass are exchanged with metal ions in the molten salt.

For example, a glass substrate is immersed in a heated potassium nitrate solution, whereby sodium ions around the surface of the glass substrate are replaced with potassium ions, each having an ion radius larger than that of the sodium ions. Consequently, compression stress works to reinforce the surface of the glass substrate. The glass substrate may be immersed in a mixed solution of silver nitrate (ranging from 0.5 to 3%) and potassium nitrate (ranging from 97 to 99.5%) for 30 minute to an hour. Consequently, silver ions permeate the surface of the substrate, so that the surface of the glass substrate is reinforced. Instead of the mixed solution of silver nitrate and potassium nitrate, a mixed solution of potassium nitrate and sodium nitrate can be employed.

As described above, the second embodiment has the following effects.

According to the second embodiment, due to the surfaces of the glass substrate material treated by scrub-etching, the glass substrate will have a fine texture free of asperity. It is therefore possible to prevent glide error and damage to the magnetic head.

According to the second embodiment, an aluminosilicate glass having the specified composition is used as the raw material, and a fine texture free of asperity is readily and reliably formed.

According to the second embodiment, since the aluminosilicate glass has a low melting temperature and good moldability, the glass substrate material can be readily manufactured by the float technique, and the resulting glass substrate has a high quality with a high degree of evenness.

According to the manufacturing method of the second embodiment, surfaces of the substrate material are scrub-etched using a pad in the presence of the acid treatment solution. This produces a fine texture without asperity, and the product yield is high.

According to the manufacturing method of the second embodiment, by using an acid solution, such as hydrofluoric acid, sulfuric acid, phosphoric acid, nitric acid and hexafluorosilicic acid, the scrub-etching is effective.

According to the manufacturing method of the second embodiment, since the hardness of the pad is less than that of the substrate material and since the pad resists the acid treatment solution, the substrate material is not scratched and the pad is not easily consumed by the acid treatment solution. Therefore, a fine texture can be formed without scratch-defects in high productibility.

In the scrub-etching of the second embodiment, the concentration of the acid treatment solution ranges from 0.01 to 1 wt %, the temperature ranges from 5 to 60° C., and the treatment time ranges from 1 to 300 seconds. Consequently, a fine texture free of asperity is efficiently formed.

Next, the second embodiment will be explained in further detail using Examples and Comparative Examples.

EXAMPLE 5

A substrate material made of aluminosilicate glass having the following composition (mol %) was scrub-etched. Composition: $SiO_2$ 66%, $Al_2O_3$ 10%, $Li_2O$ 7%, $Na_2O$ 10%, MgO 3%, and CaO 4%.

The surface of the chemically reinforced aluminosilicate glass substrate material of 2.5 inch diameter was precisely polished. Subsequently, the scrub cleaning was performed with pure water. The substrate was then immersed in a 0.1 wt % aqueous hydrofluoric acid solution (35° C.) for 1.5 minutes while being scrub-etched. After removing the substrate material from the aqueous hydrofluoric acid solution, it was immersed in a potassium hydroxide solution of pH 12 for 2.5 minutes and then scrub-cleaned again with pure water.

Figure 2:
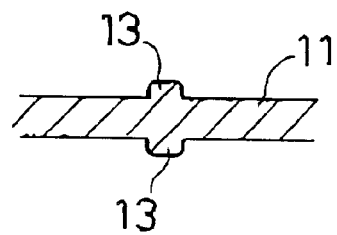
FIG. 2 is a sectional view taken along the line 2—2 in FIG. 1.

The scrub-etching was performed as follows. As shown in FIG. 1 and FIG. 2, a pad 11 has a discoidal shape larger than the glass substrate material 12. Twelve tangentially extending ribs 13 are formed on both the surfaces of the pad 11. The aqueous hydrofluoric acid solution is sufficiently stirred by the ribs 13, so that fresh aqueous hydrofluoric acid solution is applied to the substrate material 12. The pad 11 is a polyvinyl alcohol sponge (trade name: BellClean, manufactured by KANEBO Ltd.). The ribs 13 of the pad 11 contact a surface 12a of glass substrate material 12. The substrate material 12 and the pad 11 are respectively rotated by a motor in opposite directions as shown in FIG. 4B. Due to this rotation, the surface 12a is scrubbed by the surfaces of the scrubbing ribs 13 of the pad 11. The rotational speed of the pad 11 is 100 rpm. In the scrub-etching, the substrate material 12 is immersed in the aqueous hydrofluoric acid solution and, simultaneously, the pad 11 contacts the substrate surface, and the scrubbing is continued until the pad 11 is lifted.

After the this operation, a 10-μm-square area of the surface 12a was observed with an AFM. A fine texture with isotropy and without a substantially flat part between pits or projections was continuously formed on the surface 12a. An average surface roughness (Ra) of the fine texture, defined three-dimensionally, was 1.0 nm, the amplitude was 10 nm, a typical cycle was 0.3 μm. The asperity ratio (AR=Rz/Ra) was 10.

Then, on the surface of the resulting glass substrate, a titanium-silicon seed layer (25 nm), a chromium-molybdenum underlying layer (25 nm), a cobalt-nickel-chromium-tantalum magnetic layer (20 nm) and a carbon protective layer (10 nm) were successively formed by sputtering. Subsequently, a coat of perfluoropolyether based lubricant was applied to form a lubricating layer (2 nm).

In the resulting magnetic disk, the three-dimensionally defined average surface roughness (Ra) of the lubricating layer surface was 1.0 nm and the amplitude was 10 nm. That is to say, the fine texture formed on the substrate surface remained even after the lubricating layer was applied.

The resulting magnetic disk was loaded to a spindle of a ramped loading type hard disk drive, and rotated at 3600 rpm. Then, a seek operation was performed while a magnetic head with an AE sensor was held in midair, and then the output of the AE sensor was monitored. The output of the AE sensor did not indicate a strong crash between the magnetic head and the magnetic disk even in the seek operation, and gliding error did not occur. A gliding test was performed with the flying height set at 15 nm, and gliding error did not occur. The seek operation was repeated 100,000 times, and head crash did not occur.

COMPARATIVE EXAMPLE 5

The surface of a chemically reinforced 2.5-inch aluminosilicate glass substrate was precisely polished. Subsequently, scrub cleaning was performed with pure water. The substrate was then immersed in a 0.005 wt % aqueous hydrofluoric acid solution for 30 minutes while being swung. After removing the substrate material from the aqueous hydrofluoric acid solution, it was immersed in a potassium hydroxide solution of pH 12 for 2.5 minutes, and then scrub-cleaned again with pure water.

An area of 10-μm² on the substrate surface was examined with an AFM. The result shows that a fine texture with a number of discrete asperities of several nm to less than 20 nm in height were formed on the surface. While the average surface roughness (Ra) of the three-dimensionally defined fine texture was 1.0 nm, the amplitude and typical cycle could not be evaluated due to the presence of the asperity. The asperity ratio (AR=Rz/Ra) was 16.7.

Then, on the surface of the resulting glass substrate, a titanium-silicon seed layer (25 nm), a chromium-molybdenum underlying layer (25 nm), a cobalt-nickel-chromium-tantalum magnetic layer (20 nm) and a carbon protective layer (10 nm) were successively formed by sputtering. Subsequently, a perfluoropolyether based lubricant was applied to form a lubricating layer (2 nm).

In the resulting magnetic disk, the three-dimensionally defined average surface roughness (Ra) of the lubricating layer surface was 1.0 nm, and the asperity ratio (AR=Rz/Ra) was 17. That is to say, the fine texture including the asperity formed on the substrate surface remained even after the lubricating layer surface was applied.

The magnetic disk was loaded in a ramped loading type hard disk drive and rotated at 3600 rpm. Then, a seek operation was performed while a magnetic head with an AE sensor was held in midair while the output of AE sensor was. monitored. Many indications of strong crashes between the magnetic head and the magnetic disk during the seek operation occurred. As the seek operation was repeated, the head crashed before reaching 100,000 times.

EXAMPLE 6

In Example 5, the glass substrate was scrub-etched in hydrofluoric acid solution for 20 minutes. Other operations were the same as those in Example 5.

As a result, the average surface roughness (Ra) of the glass substrate was 1.5 nm, and the asperity ratio (AR=Rz/Ra) was 10. Similar to Example 5, damage to the magnetic head and gliding error did not occur. The seek operation was repeated one hundred thousand times, but no head crash occurred.

The second embodiment may be changed as follows.

The texture may be formed only in a CSS zone of the glass substrate. In this case, areas other than the CSS zone can be kept in a smooth surface. Thus, when the glass substrate is employed for a magnetic disk medium, lower levitation of the magnetic head is allowed, thereby making it possible to achieve a high recording density of the magnetic disk drive.

The ribs 13 may be formed only on one side of the pad 11. In this case, the formation of the pad 11 is simplified.

The pad 11 may be generally conical cylindrical.

The rib 13 may have a semi-circular or triangular cross-section.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A method for manufacturing a glass substrate for a magnetic disk, comprising texturing a polished surface of the glass substrate material to form a textured surface having reduced occurrence of asperity than the polished surface and having an average surface roughness Ra in a range of from 0.4 nm to 3 nm and a ratio of a 10-points mean roughness Rz to the average surface roughness Ra of 14 or less, the texturing including scrub-etching a surface of the glass substrate material using a scrubbing pad in the presence of an acid treatment solution.

2. The manufacturing method according to claim 1, wherein the acid treatment solution includes at least one material selected from the group consisting of hydrofluoric acid, sulfuric acid, phosphoric acid, nitric acid and hexafluorosilicic acid.

3. The manufacturing method according to claim 1, wherein the scrub-etching step includes using the pad having a hardness less than that of the glass substrate material, wherein the pad resists the acid treatment agent.

4. The manufacturing method according to claim 3, wherein the scrub-etching step includes using the acid treatment solution with at least one additive selected from the group consisting of a chelating agent and a surface active agent.

5. The manufacturing method according to claim 1, wherein the scrub-etching step is performed with a 0.01 to 1 wt % acid treatment solution at a treatment temperature ranging from 5 to 60° C. and for a treatment period ranging from 1 to 300 seconds.

6. The manufacturing method according to claim 1, wherein the scrub-etching step includes using a pad having a surface with projections, wherein the projections contact the surface of the glass substrate.

7. The manufacturing method according to claim 1, wherein the scrub-etching step includes the step of rotating the pad or the step of rotating and revolving the pad.

8. The manufacturing method according to claim 1, wherein the scrub-etching step includes the step of rotating and swaying the pad.

9. The manufacturing method of claim 1, comprising after the texturing, forming a magnetic layer supported by the glass substrate material and overlying at least a portion of the textured surface.

10. The manufacturing method of claim 1, wherein the polished surface has an average surface roughness Ra of 1 nm or less.

11. The manufacturing method of claim 10, comprising, prior to the scrub-etching, forming the polished surface, comprising finely polishing a surface of the glass substrate material.

12. The manufacturing method of claim 1, wherein the glass substrate material is selected from the group consisting of aluminosilicate glass, crystallized glass and soda lime glass.

13. The manufacturing method of claim 1, wherein the glass substrate material is an aluminosilicate glass comprising:

silicon dioxide ($SiO_2$) in a range of from 40 to 72 mole percent, and aluminum oxide ($Al_2O_3$) in a range of from 0.5 to 25 mole percent.

14. The manufacturing method of claim 13, wherein the aluminosilicate glass comprises:

lithium oxide ($Li_2O$) in a range of from 0 to 22 mole percent;

sodium oxide (NaO) in a range of from 0 to 14 mole percent;

potassium oxide ($K_2O$) in a range of from 0 to 10 mole percent;

magnesium oxide (MgO) in a range of from 0 to 25 mole percent;

calcium oxide (CaO) in a range of from 0 to 25 mole percent;

strontium oxide (SrO) in a range of from 0 to 10 mole percent;

barium oxide (BaO) in a range of from 0 to 10 mole percent;

titanium oxide ($TiO_2$) in a range of from 0 to 10 mole percent; and zirconium oxide ($ZrO_2$) in a range of from 0 to 10 mole percent;

wherein the total of lithium oxide ($Li_2O$), sodium oxide (NaO) and potassium oxide ($K_2O$) is in a range of 2 to 30 mole percent; and wherein the total of magnesium oxide (MgO), calcium oxide (CaO), strontium oxide (SrO) and barium oxide (BaO) is in a range of from 0 to 40 mole percent; and wherein the sum of the silicon dioxide ($SiO_2$), aluminum oxide ($Al_2O_3$), lithium oxide (Li2O), sodium oxide (NaO), potassium oxide ($K_2O$), magnesium oxide (MgO), calcium oxide (CaO), strontium oxide (SrO), barium oxide (BaO), titanium oxide ($TiO_2$), and zirconium oxide ($ZrO_2$) comprise from 95 mole percent to 100 mole percent of the aluminosilicate glass.

15. A method of manufacturing a substrate for a magnetic disk, comprising forming a fine texture, having an average surface roughness Ra in a range between 0.4 and 3.0 nm and a ratio of a 10-points mean roughness Rz to the average surface roughness Ra of 14 or less, on a substrate made of an inorganic material or on a substrate having an alloy film on a surface thereof, wherein the forming step includes the repeatedly performing an immersion process or scrub process several times using an acid solution under different treatment conditions.

16. The manufacturing method according to claim 15, wherein the substrate has the alloy film on a surface thereof and the alloy film includes a nickel-phosphorus (NiP) film.

17. The manufacturing method according to claim 15, further comprising the step of:

performing a treatment using a neutral solution or an alkaline solution between the acid treatment process or after the acid treatment process.

18. The manufacturing method according to claim 17, wherein the neutral solution or the alkaline solution includes an aqueous solution including at least one of a surface active agent and an chelating agent.

19. The manufacturing method according to claim 15, wherein the substrate is made of the inorganic material and the inorganic material includes a glass substrate etched to a depth of 50 to 10000 nm when undergoing an immersion treatment in a 0.1 wt % aqueous hydrofluoric acid solution at 50° C. for 2.5 minutes.

20. The manufacturing method according to claim 19, wherein the glass substrate includes calcium oxide (CaO) in the amount of 10 wt % or less and magnesium oxide (MgO) in the amount of 15 wt % or less.

21. The manufacturing method according to claim 15, further comprising forming a new texture on a particular area on the surface of the substrate by irradiating the particular area with a laser beam.

22. The manufacturing method according to claim 11, wherein the substrate is glass, and
the repeatedly performing an immersion process or the scrub process several times includes a first treatment using an acid solution including hydrofluoric acid in a range of 0.01 to 1 wt %; and a second treatment using an acid solution including hydrofluoric acid in a range of 0.001 to 0.5 wt %.

23. The manufacturing method according to claim 15, wherein the immersion process or the scrub process is performed on a substrate having an average surface roughness Ra of 1 nm or less.

24. The manufacturing method of claim 15, wherein during a first said immersion process or scrub process, at least a first surface of the substrate is unequally etched.

25. The manufacturing method of claim 24, wherein average surface roughness Ra of the first surface of the substrate is larger after the first said immersion process or scrub process than before the first said immersion process or scrub process.

26. The manufacturing method of claim 24, wherein average surface roughness Ra of the first surface of the substrate is at least 0.4 nm larger after the first said immersion process or scrub process than before the first said immersion process or scrub process.

27. The manufacturing method of claim 24, wherein during a second said immersion process or scrub process, a modification is made to at least the first surface, the modification being selected from the group consisting of removing a layer at the first surface having non-uniform composition and structure, forming an alteration layer at the first surface and combinations thereof.

28. The manufacturing method of claim 27, wherein the second said immersion process or scrub process precedes the first said immersion process or scrub process.

29. The manufacturing method of claim 15, wherein the substrate includes an almuninosilicate glass, the aluminosilicate glass comprising:
   silicon dioxide ($SiO_2$) in a range of 58 to 78 weight percent;
   aluminum oxide ($Al_2O_3$) in a range of 9 to 22 weight percent;
   lithium oxide ($Li_2O$) in a range of from 2 to 10 weight percent;
   sodium oxide (NaO) in a range of from 4 to 13 weight percent;
   potassium oxide ($K_2O$) in a range of from 0 to 5 weight percent;
   magnesium oxide (MgO) in a range of from 0 to 4 weight percent;
   calcium oxide (CaO) in a range of from 0 to 7 weight percent;
   strontium oxide (SrO) in a range of from 0 to 2 weight percent;
   barium oxide (BaO) in a range of from 0 to 2 weight percent;
   titanium oxide ($TiO_2$) in a range of from 0 to 2 weight percent;
   cerium oxide ($CeO_2$) in a range of from 0 to 2 weight percent;
   iron oxide ($Fe_2O_3$) in a range of from 0 to 2 weight percent;
   manganese oxide (MnO) in a range of from 0 to 1 weight percent; and
   zirconium oxide ($ZrO_2$) in a range of from 0 to 7 weight percent.

* * * * *

UNITED STATES PATENT AND TRADEMARK OFFICE
CERTIFICATE OF CORRECTION

PATENT NO.   : 6,553,788 B1
DATED        : April 29, 2003
INVENTOR(S)  : Ikeda et al.

It is certified that error appears in the above-identified patent and that said Letters Patent is hereby corrected as shown below:

<u>Column 24,</u>
Line 4, delete "78" and insert therefor -- 70 --.

Signed and Sealed this

Fifteenth Day of March, 2005

JON W. DUDAS
*Director of the United States Patent and Trademark Office*